United States Patent Office 2,971,659
Patented Feb. 14, 1961

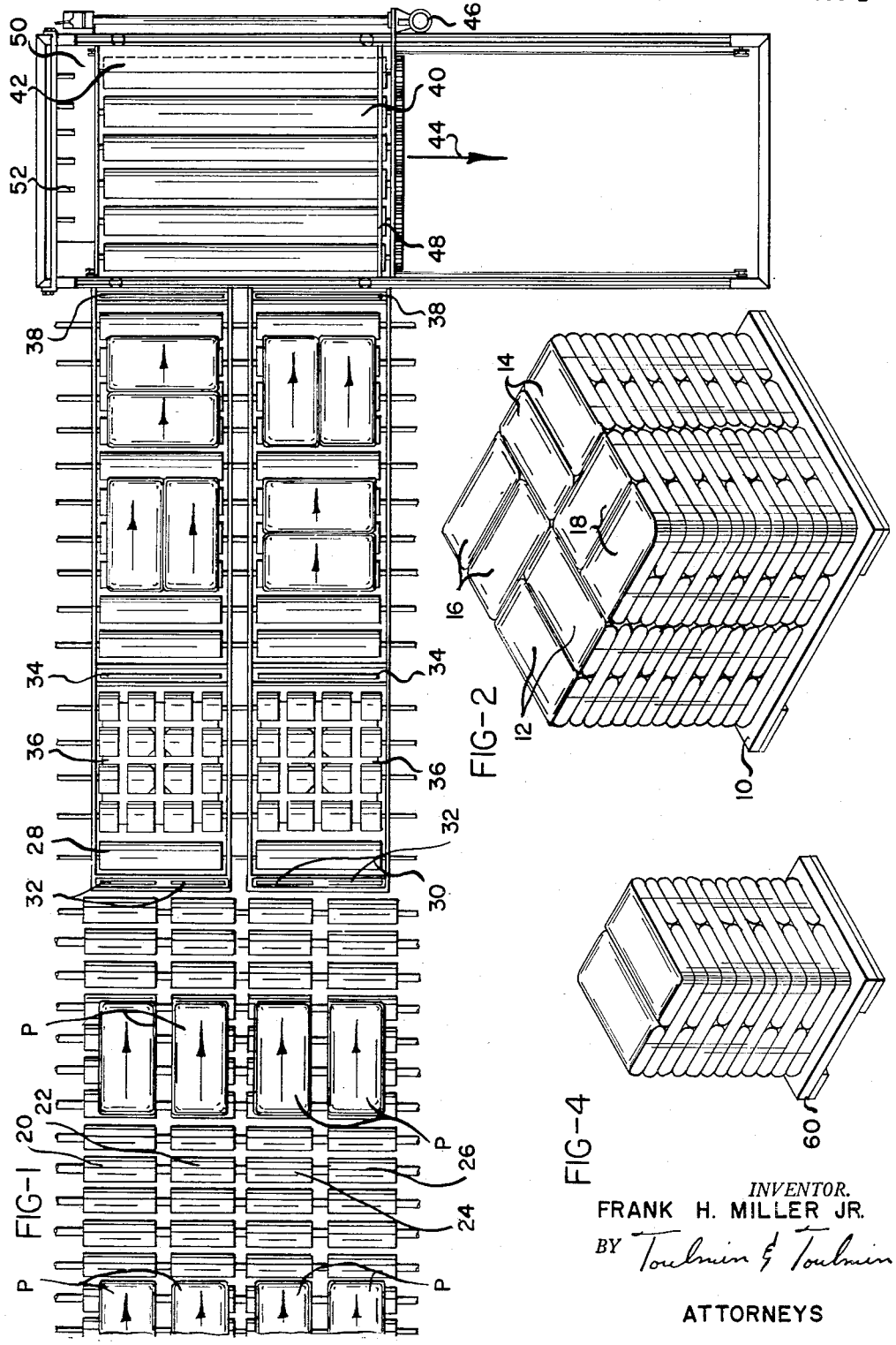

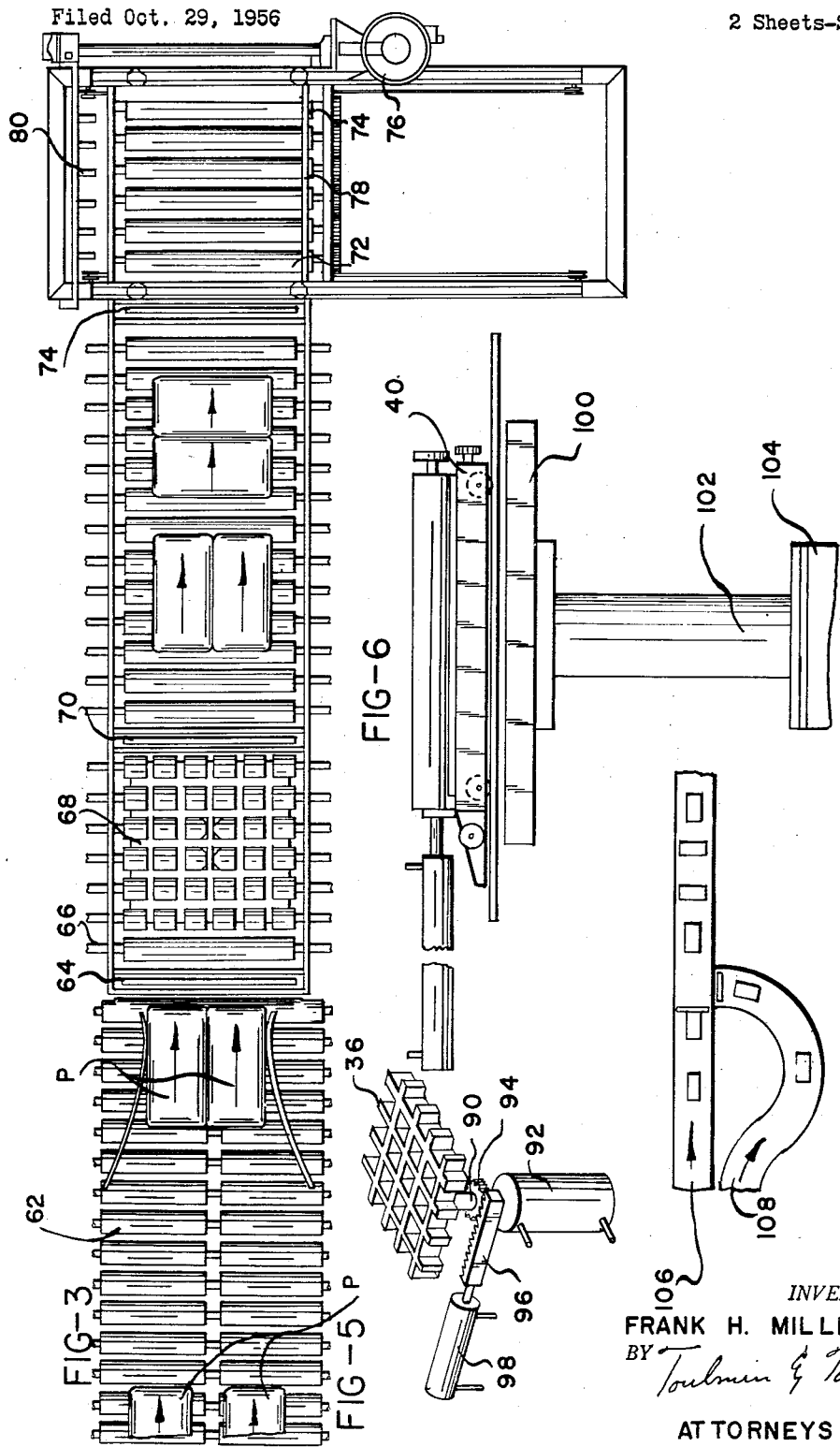

2,971,659
APPARATUS FOR PALLETIZING

Frank H. Miller, Jr., Louisville, Ky., assignor to Miller Engineering Corporation, Louisville, Ky., a corporation of Kentucky Filed Oct. 29, 1956, Ser. No. 619,036

6 Claims. (Cl. 214—6)

This invention relates to apparatuses for palletizing packages, such as cartons or bags, and is a further extension and refinement of the palletizing methods as disclosed in co-pending United States application Serial No. 460,482, filed November 5, 1954, now Patent No. 2,813,638, in the name of Frank H. Miller, Jr. and assigned to the same assignee as the present application, and United States application Serial No. 466,727, filed November 4, 1954, now Patent No. 2,780,340, in the name of Frederick R. Hynson and assigned to the same assignee as the present application.

In the palletizing of cartons and packages this is most advantageously done in conjunction with the packaging or bagging operation so that the packages move directly from the packaging station to the palletizing station.

It will be evident that it is preferable for the palletizing station to be able to handle packages at the same rate that they are discharged from the packaging station.

Heretofore automatic palletizing devices have been too slow to handle the production of a rapid automatic packaging installation, thus introducing the difficulty that the packages had to be stored between the packaging station and the palletizing station.

The present invention represents a development different from that disclosed in the co-pending applications referred to above, because in the present invention the patternizing operation on the carton or package is transferred from the roll table to a section of the conveyor leading to the table thereby eliminating the halting of the roll table in a plurality of positions for the purpose of building up a pattern. In this manner the operation of the roll table in the act of transferring layers to a pallet is greatly speeded up, and that the speed of the entire palletizing operation is increased since the patternizing is accomplished substantially simultaneously with the conveying rather than occurring as a substantially separate step.

The present invention has as its particular object the provision of an apparatus for palletizing in which the rate at which packages are handled is increased substantially over what is known in the prior art, thereby greatly extending the field for use of the palletizing arrangement and eliminating the difficulties that have heretofore been encountered due to the slow speed of operation of the palletizing devices.

A further object of the present invention is the provision of a palletizing apparatus in which parallel sources of supply can be handled simultaneously, thus multiplying the rate of speed at which packages can be handled and palletized.

A still further object of the present invention is the provision of an apparatus for handling multiple streams of packages to effect the palletizing thereof without rotating any of the packages during movement toward the palletizing station.

These and other objects and advantages of this invention will become more apparent upon reference to the following specification taken in connection with the accompanying drawings, wherein:

Figure 1 is a plan view of a palletizing arrangement according to the present invention in which four parallel supplies are delivered to the palletizing station, and all of which are handled simultaneously;

Figure 2 is a perspective view showing a pallet load made up by the apparatus of Figure 1;

Figure 3 is a plan view showing a somewhat different palletizing apparatus in which two parallel sources of supply are employed;

Figure 4 is a perspective view showing a pallet load as made by the apparatus of Figure 3;

Figure 5 is a diagrammatic view showing one form which the turning station associated with either of the palletizing arrangements of Figures 1 and 3 could take;

Figure 6 is a more or less diagrammatic view showing the manner in which the receiving roll table of either of the palletizing arrangements is positioned relative to the elevator platform that receives the layers in the manner in which the elevator platform is actuated; and Figure 7 is a diagrammatic plan view showing a conveyor arrangement according to the present invention in which there are no turning stations for turning the packages.

The apparatus disclosed in the present application generally comprises an arrangement for receiving a plurality of streams of packages and for selectively rotating certain ones of said packages, and for delivering a combination of turned and unturned packages to a platform to build up a layer, and which layer, when completed, is transferred to an elevator platform to form one layer of a pallet load; which load, when completely built up on the elevator platform, is transferred to the pallet.

The particular individual instrumentalities associated with the palletizing apparatuses, such as the turning station, the receiving roll table platform on which the layers are built up, the structure for actuating the roll table platform, the elevator structure and its associated actuating mechanism, and the interlocking control circuit, can readily be adapted from the co-pending applications referred to above and thus, per se, are not a part of the present invention except as they form a part of the combination and perform certain specified functions and cooperate in carrying out the method of the present invention.

Referring now to Figures 1 and 2, in Figure there is shown an arrangement for handling simultaneously four parallel supplies of packages that are delivered to the palletizing apparatus in a common oriented position; for example, lengthwise in the direction of movement of the packages. These packages are passed on to the receiving table of the platform with selective turning, and there is thus built up a layer on the table that can be transferred to a pallet. A plurality of the layers will make an entire load, as shown in Figure 2.

In Figure 2 it will be evident that the pallet 10 has built thereon a plurality of layers, with each layer consisting of two straight pairs of packages and two turned pairs; the straight pairs being indicated at 12 and 14 and the turned pairs being indicated at 16 and 18. Each alternate layer has the straight and turned packages interchanged, and this provides for a stable interlocked pallet load which is easy to handle, and which can readily be handled for shipping and otherwise conveniently moved about as the occasion requires.

In the arrangement of Figure 1 the supply conveyors, preferably roll conveyors, are indicated at 20, 22, 24 and 26, and these deliver the packages "P" lengthwise therealong to the secondary roll conveyors 28 and 30. At the entrance end of each of the roll tables are stop plates 32; which stop plates are normally positioned below the level at which the packages pass from the supply conveyors to the secondary roll conveyors, but which can be moved upwardly to stop the movement of packages from any of the supply conveyors.

The control of the stop plates 32, as well as other stop plates that will be described hereinafter, can be controlled similarly to the stop plates shown in the co-pending applications referred to above. Such control, for example, could be accomplished by actuating the stop plates by hydraulic or electrical means and controlling the energization of the hydraulic or electrical means by an energizing circuit under the control of a counting arrangement which includes a limit switch that counts the packages as they move along the belt conveyor.

A control mechanism arrangement for a turning grid of the general nature disclosed in the present application is disclosed more in detail in the co-pending Hynson application, Serial No. 466,727, filed November 4, 1954, and assigned to the same assignee as the instant application.

When the stop plates 32 release the packages to the secondary roll conveyors the packages either pass straight thereacross without turning, or are stopped by second stop plates 34 over the turning grids 36. The turning grids 36 are adapted for being raised upwardly to lift the packages from the conveyor and then to rotate 90° and then again to set down, whereupon the packages are returned to the conveyor to continue their travel therealong in a turned position; stop plates 34 being retracted at the time the grid again lowers.

According to the present invention the pairs of the packages passing along each secondary roll conveyor are rotated so that each layer consists of two turned pairs and two unturned pairs, as has been described in connection with Figure 2.

At the end of each of the secondary roll conveyors 28 and 30 are stop plates 38 which can be employed for stopping the packages on the roll conveyors until the receiving roll table 40 is in proper position. When roll table 40 is in proper position and the stop plates 38 are retracted downwardly a layer, consisting of eight packages, can be delivered to the roll table and will be positioned thereon against stationary stop plate 42.

When the layer is in position on the roll table, the roll table is reciprocated in the direction of the arrow 44 by hydraulic motor 46, and the layer of packages thereon is stripped off the table by stationary stripper bar 48 and slide off the incline 50 at one edge of the roll table over the glue applicator rolls 52 and drop on to an elevator platform located directly beneath the roll table.

It will be noted that the roll table makes a single continuous movement in effecting the transfer of a layer to the pallet, and then in one single movement returns to position for receiving another layer, thereby eliminating the halting of the roll table in different positions for building up a layer of several rows thereon.

After the load has been transferred in this manner the roll table 40 is returned to the position in which it is illustrated in Figure 1, and is then ready to receive another pallet layer which will be identical with the first except that the position of the straight and turned packages will be reversed. The elevator beneath the roll table 40 is arranged to lower an amount equal to the thickness of each layer delivered thereto so that the packages are always received from the roll table at about the same level.

In the Figure 3 arrangement the supply consists of two parallel streams of packages and a pallet load is built up, as is illustrated in Figure 4, wherein the pallet 60 has loaded thereon a plurality of layers, each of which consists of two packages, with the packages in one layer being turned and those in the next adjacent layer being straight.

Figure 3 shows an apparatus comprising an incoming supply conveyor 62, preferably a roll conveyor, on which the packages "P" are arranged in the direction of their length in two parallel streams. A stop plate 64 at the end of the conveyor 62 provides means for stopping the packages so they can be delivered in pairs to the secondary roll conveyor 66. Roll conveyor 66 comprises a turning platform or turning grid 68 which may be identical with the turning grid 36 referred to in connection with Figure 1. The above-referred to co-pending Hynson application, Serial No. 466,727, shows and describes this operation more in detail.

A stop plate 70 in the discharge side of the turning station provides means for halting the pairs of packages that are to be turned by the grid, and which stop plate 70 can be retracted downwardly to permit packages to pass from the grid on down the conveyor 66. At its extreme end the conveyor 66 delivers to a receiving roll table 72, with a stop plate 74 being provided to prevent packages from being discharged from the conveyor 66 before the roll table is in position.

The roll table 72 in Figure 3 is arranged similarly to the roll table 40 described in connection with Figure 1, and is adapted, when a pallet layer consisting of two packages is delivered thereto, to reciprocate under the influence of motor 76 whereby the pallet load is stripped off the table by stripper bar 78 so as to drop on the elevator platform positioned beneath the roll table. The packages, in being stripped from the roll table, pass over the glue applicator rolls 80 so that they will adhere to the next layer therebeneath when delivered to the pallet load.

It will be noted that roll table 72, shown in Figure 3, is also characterized in that it does not halt in any intermediate position, but makes a single continuous movement in unloading a layer to a pallet on top of the previously unloaded layer, and also makes a single movement to a position to receive a new layer.

Figure 5 illustrates one manner in which the turning grids could be operated. In Figure 5 the turning grid 36 is mounted on the upper end of a ram 90 extending into a hydraulic cylinder 92, and provides means for selectively raising and lowering the said grid. Associated with ram 90 is a pinion 94 which may be water-keyed to the ram so that the ram may slide therethrough or which may be formed directly on the ram. Pinion 94 is engaged by a rack 96 arranged for being reciprocated by fluid motor 98.

The arrangement provides means whereby the grid can be raised, then rotated in one direction, then lowered, and then on the next turning cycle the grid can be again raised, then rotated back to its original position, and then again lowered.

In Figure 6 the roll table 40 is illustrated in association with the elevator platform 100 to which the packages are delivered from the roll table. Elevator platform 100 may be actuated in its raising and lowering movements in any suitable manner, such as by the ram 102 that extends into a cylinder 104. The elevator can also be controlled in the manner illustrated in the co-pending applications referred to above if preferred.

The present invention also contemplates effecting the turning of one or more of a plurality of streams of supply without employing rotating platforms in the conveyor. Such an arrangement is illustrated in Figure 7 wherein there is a straight conveyor 106, preferably a roll conveyor, along which the packages are delivered without turning, and a second conveyor 108, also preferably a roll conveyor, which is arranged so that packages are turned on the conveyor to an angle of 90° to the direction of movement of the packages on conveyor 106. By an arrangement of stops at the junction of the conveyors the conveyor 106 can be provided with any predetermined pattern of straight and turned packages in a straight line. Further, a second conveyor may be provided adjacent conveyor 106 to receive the turned packages from conveyor 108, thus providing parallel supplies of turned and unturned packages which could be utilized for building up pallet loads according to the principles of the present invention.

It will be evident that the arrangement of the present invention provides means for handling packages at greatly increased speed, and that the palletizing structures according to the present invention can thus handle the delivery from almost any packaging apparatus of a conventional type.

In the arrangement of Figure 1, for example, wherein each layer on the pallet comprises eight packages and there are four feeding conveyors, if the roll table 40 is arranged to complete the cycle every four seconds, and 100 pound bags are being handled, a palletizing rate of about 12,000 pounds per minute will obtain.

It will be apparent that the same high rates of palletizing loads can be had with any of the arrangements by providing for substantially continuous and rapid movement of the packages to the roll table and then to the elevator platform.

The present invention in every case involves multiple feed or supply conveyors, and receives the packages therefrom and rotates and arranges them in groups and transfers the groups as layers to a pallet.

It will be understood that this invention is susceptible to modification in order to adapt it to different usages and conditions, and accordingly it is desired to comprehend such modifications within this invention as may fall within the scope of the appended claims.

I claim:

1. In a palletizing apparatus; two pairs of feed conveyors for supplying packages in a common oriented position, an intermediate conveyor for each pair of feed conveyors adapted for receiving pairs of packages therefrom in side by side relation, a turning station pertaining to each intermediate conveyor, each turning station being adapted for passing two pairs of the packages thereover without turning and for then turning the next two pairs of the packages, each turning station operating independently of the other in turning one of the two pairs pertaining thereto and operating simultaneously with the other in turning the other pair pertaining thereto, a receiving table adapted for receiving two pairs of packages from each intermediate conveyor, one pair of the packages so received from each conveyor being turned and the other pair being straight, means for transferring the layer so delivered to the receiving table to a pallet, and means for interrupting the discharge of the packages from the intermediate conveyors during the said transferring.

2. An apparatus for palletizing packages and comprising a plurality of parallel supply conveyors, an intermediate conveyor for each pair of supply conveyors so that each intermediate conveyor has a pair of adjacent packages delivered thereto from the supply conveyors, a turning station in each intermediate conveyor operable for selectively turning the pairs of packages passing therealong, a control circuit for actuating said turning station so that packages may be rotated concurrently on both intermediate conveyors, a receiving table arranged to receive the pairs of packages from said intermediate conveyors to form a pallet layer therefrom, means for transferring each said pallet layer to a pallet, and successive of said layers comprising different arrangements of straight and turned packages.

3. In a palletizing apparatus; two pairs of feed conveyors for supplying packages in a common oriented position, an intermediate conveyor for each pair of feed conveyors adapted for receiving pairs of packages therefrom in side by side relation, a turning station pertaining to each intermediate conveyor, each turning station being adapted for passing two pairs of the packages thereover without turning and for then turning the next two pairs of the packages, a control circuit for operating each turning station independently of the other in turning one of the two pairs of packages pertaining thereto and for simultaneously operating each turning station with the other turning station in turning the other pair of packages pertaining thereto, a receiving table adapted for receiving two pairs of packages from each intermediate conveyor, one pair of the packages so received from each conveyor being turned and the other pair being straight, means for transferring the layer so delivered to the receiving table to a pallet, and means for interrupting the discharge of the packages from the intermediate conveyors during the said transferring.

4. An apparatus for palletizing rectangular packages and comprising; a first conveyor system consisting of a plurality of parallel supply conveyors to advance said packages longitudinally and substantially abreast of each other along said conveyors, a plurality of turning stations equal in number to the number of pairs of supply conveyors to selectively turn pairs of packages 90°, a second conveyor system to move turned and straight packages in the same direction as that of the first conveyor system, a retractable member adapted to receive a layer of said turned and straight packages, means for retracting said member from beneath said layer to transfer said layer onto a pallet load, and elevator means for successively lowering said pallet load.

5. In a palletizing apparatus, two pairs of feed conveyors for supplying packages in a common oriented position, an intermediate conveyor for each pair of feed conveyors for receiving pairs of packages therefrom in side by side relation, a turning station pertaining to each intermediate conveyor, each turning station operating independently of the other in turning one of the two pairs pertaining thereto and operating simultaneously with the other in turning the other pair pertaining thereto, a receiving table for receiving two pairs of packages from each intermediate conveyor, one pair of the packages so received from each conveyor being turned and the other pair being straight, means for retracting said receiving table from beneath said layer of packages to transfer said layer onto a pallet load, and elevator means for successively lowering said pallet load.

6. In a palletizing apparatus, a first conveyor system for supplying packages along a plurality of parallel paths with said packages being in a common oriented position, an intermediate conveyor system adjacent said first conveyor system for receiving packages delivered from said first conveyor system, a turning station positioned adjacent each of the conveyors comprising said intermediate conveyor system, said turning stations operating independently of each other in turning pairs of packages delivered from said first conveyor system 90° so that said intermediate conveyor system receives packages both in their oriented positions and turned 90°, said intermediate conveyor system moving the packages delivered thereon in the same direction as that of the first conveyor system, a retractable member for receiving a layer of said turned and straight packages from said intermediate conveyor system, means for retracting said member from beneath said layer of packages to transfer said layer onto a pallet load, and elevator means for successively lowering said pallet load.

References Cited in the file of this patent

UNITED STATES PATENTS

| | | |
|---|---|---|
| 2,633,251 | Bruce | Mar. 31, 1953 |
| 2,655,271 | Cole et al. | Oct. 13, 1953 |
| 2,769,558 | Ehlers | Nov. 6, 1956 |